(12) United States Patent
Sheng (10) Patent No.: US 9,712,713 B2
(45) Date of Patent: *Jul. 18, 2017

(54) DUPLEX PERIPHERAL CAPABLE OF PROCESSING LARGE-SIZE AND SMALL-SIZE DOCUMENTS

(71) Applicant: AVISION INC., Hsinchu (TW)

(72) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,235

(22) Filed: Feb. 27, 2015

(65) Prior Publication Data
US 2015/0304514 A1    Oct. 22, 2015

(30) Foreign Application Priority Data
Apr. 16, 2014  (TW) .............................. 103113794 A (51) Int. Cl.
*H04N 1/203*  (2006.01)
*H04N 1/387*  (2006.01)

(52) U.S. Cl.
CPC ......... *H04N 1/2032* (2013.01); *H04N 1/3878* (2013.01)

(58) Field of Classification Search
None
See application file for complete search history.

(56) References Cited

U.S. PATENT DOCUMENTS

| 5,103,322 | A  | * | 4/1992 | Beck ............... | H04N 1/0057 271/272 |
| 5,680,204 | A  | * | 10/1997 | Ferrara .............. | H04N 1/1017 355/75 |
| 6,563,598 | B1 | * | 5/2003 | Johnson ............. | G06K 15/00 358/1.1 |
| 6,612,561 | B2 | * | 9/2003 | Sekine .............. | H04N 1/00519 271/145 |
| 8,787,702 | B1 | * | 7/2014 | Withers ............. | G06K 9/3208 382/135 |

(Continued)

FOREIGN PATENT DOCUMENTS

| TW | I250083 | 3/2006 |
| TW | 201142717 | 12/2011 |
| TW | M417261 | 12/2011 |

*Primary Examiner* — Fan Zhang (57) ABSTRACT

A duplex peripheral comprises: a passage; a feeding mechanism transporting a medium into the passage; two scanning modules disposed on two sides of the passage and acquiring front and reverse side images of the medium, respectively; a transporting mechanism transporting the medium through the passage and past the scanning modules; a control module, electrically connected to the scanning modules, the feeding mechanism and the transporting mechanism, and digitizing the front side image and the reverse side image; and an output unit electrically connected to the control module, and receiving and outputting the front and reverse side images. A width of the medium that can be accommodated within the passage and the feeding mechanism is greater than or equal to a short side of an A4 size sheet. The transporting mechanism defines a transportable gap smaller than or equal to a short side of an A7 size sheet.

14 Claims, 6 Drawing Sheets

(56) References Cited

U.S. PATENT DOCUMENTS

| | | | |
|---|---|---|---|
| 2004/0008884 A1* | 1/2004 | Simske | H04N 1/4095 382/165 |
| 2005/0067768 A1* | 3/2005 | Connor | B65H 5/021 271/226 |
| 2005/0093959 A1* | 5/2005 | Kitamura | B41J 2/325 347/222 |
| 2006/0163798 A1* | 7/2006 | Wong | B65H 1/04 271/162 |
| 2008/0285097 A1* | 11/2008 | Kitagawa | H04N 1/0057 358/498 |
| 2009/0283953 A1* | 11/2009 | Tu | B65H 1/04 271/3.14 |
| 2011/0141534 A1* | 6/2011 | Safonov | H04N 1/00413 358/474 |
| 2011/0292464 A1* | 12/2011 | Shih | H04N 1/00713 358/474 |
| 2012/0045129 A1 | 2/2012 | Sun et al. | |
| 2012/0274994 A1* | 11/2012 | Westcott | H04N 1/0464 358/498 |
| 2012/0307324 A1* | 12/2012 | Tu | H04N 1/00522 358/498 |
| 2014/0138898 A1* | 5/2014 | Maeda | B65H 3/06 271/3.16 |

* cited by examiner

DUPLEX PERIPHERAL CAPABLE OF PROCESSING LARGE-SIZE AND SMALL-SIZE DOCUMENTS

This application claims priority of No. 103113794 filed in Taiwan R.O.C. on Apr. 16, 2014 under 35 USC 119, the entire content of which is hereby incorporated by reference.

BACKGROUND OF THE INVENTION

Field of the Invention

The present invention relates to a peripheral, and more particularly to a duplex peripheral capable of processing both a large-size document and a small-size document.

Related Art

Figure 1:
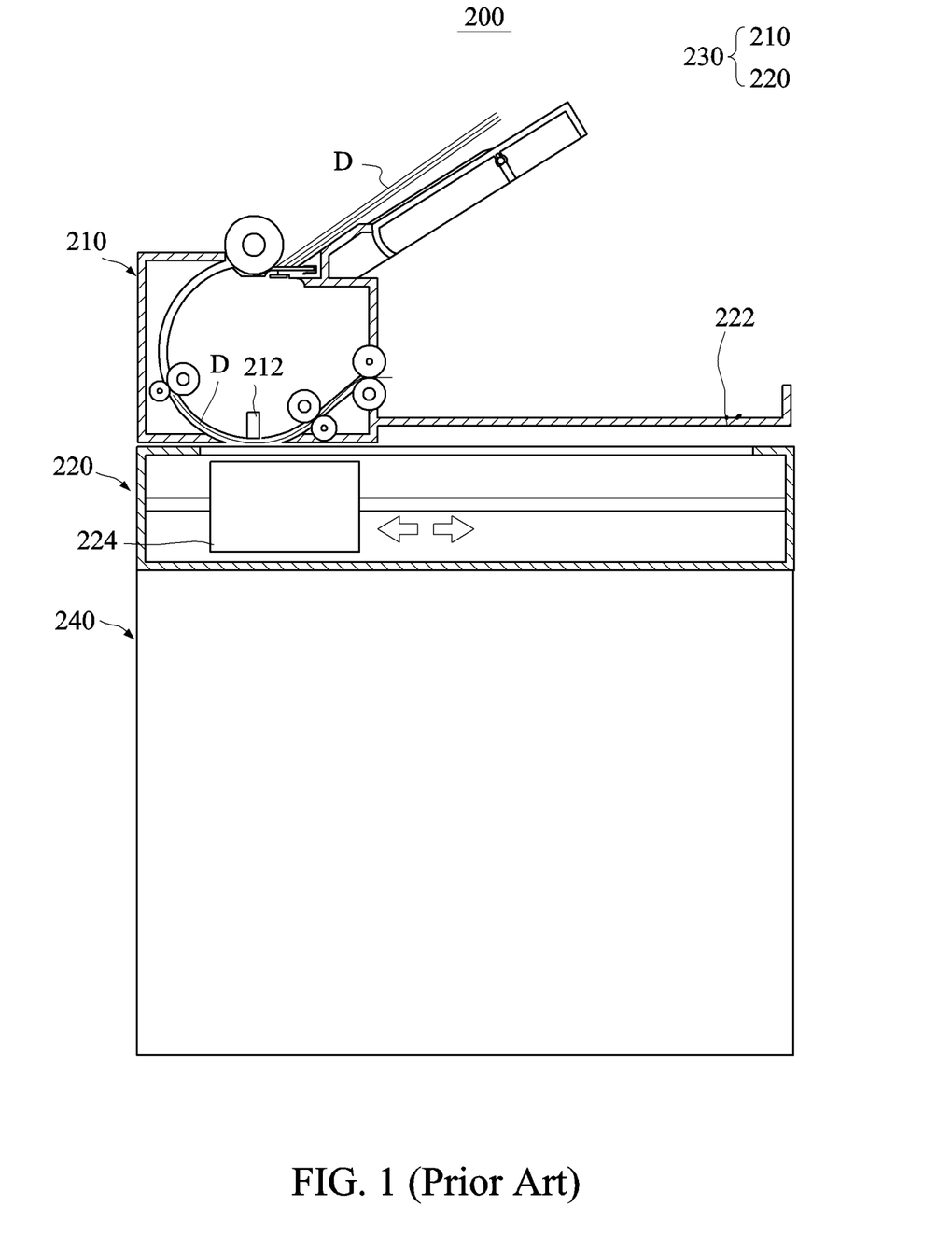
FIG. 1 shows a schematic view of a conventional copier.

FIG. 1 shows a schematic view of a conventional copier 200. Referring to FIG. 1, the conventional copier 200 usually comprises a scanning device 230 and a printing device 240. The scanning device 230 comprises a flatbed scanning unit 220 and a sheet-fed scanning unit 210 so that the user can perform a flatbed scan operation and a sheet-fed scan operation. The flatbed scanning unit 220 can utilize a movable scanning module 224 to scan a bound book, and the sheet-fed scanning unit 210 can scan a plurality of documents D at one time. However, the sheet-fed scanning unit 210 is disposed on an upper cover 222 of the flatbed scanning unit 220, wherein the upper cover 222 also functions as a document storage tray for storing the documents D scanned by the sheet-fed scanning unit 210. The drawback of such the design is that the user cannot utilize the sheet-fed scan of the small-size hard document because the small-size hard document cannot be smoothly transported past the curved transporting passage. In addition, the gap between the rollers on two sides of a sensor 212 in the sheet-fed scanning unit 210 is too large, and the small-size hard document cannot be transported smoothly.

In addition, the market-available copier usually uses a bulky caterpillar-type sheet-feeding mechanism, which is not adapted to the transportation of the hard document, such as a certificate, a card or the like. The user only can perform the flatbed scan operation to scan the hard document, and it becomes more troublesome when the duplex images of the hard document need to be scanned. For example, if the user wishes to copy a front side image and a reverse side image of an identity card on the same side of a sheet, the identity card cannot be transported in the sheet passage due to the U-shaped sheet passage even if each of the sheet-fed scanning unit and the flatbed scanning unit has one scanning module. Thus, the user still needs to perform the scan by using the flatbed scanning unit. In this manner, the user needs to firstly open the upper cover, then place the identity card, then close the upper cover, and then press the confirmation key to copy the first side of the identity card on the sheet. Then, the sheet printed with the first side is re-placed into the correct tray with the correct side facing upwards. Next, the identity card is flipped over, and is placed onto the platen at another position, which is close to but does not overlap with the previous position so that the second side can be copied. Such processes are very complicated and tend to fail. It is more time and labor consuming when a lot of such documents are to be copied.

SUMMARY OF THE INVENTION

Accordingly, the present invention has been proposed to solve the problems of the prior art, and it is an object of the present invention to provide a duplex peripheral capable of processing both large-size documents and small-size documents.

To achieve the above-identified object, the present invention provides a peripheral comprising: a passage; a feeding mechanism, which is disposed on a front end of the passage and transports a medium into the passage to provide a sheet-fed scan mode to a user; two scanning modules, which are disposed on two sides of the passage and acquire a front side image and a reverse side image of the medium, respectively; a transporting mechanism transporting the medium through the passage past the scanning modules; a control module, which is electrically connected to the scanning modules, the feeding mechanism and the transporting mechanism, and digitizes the front side image and the reverse side image coming from the scanning modules; and an output unit, which is electrically connected to the control module, and receives and outputs the front side image and the reverse side image. A width of the medium that can be accommodated within the passage and the feeding mechanism is substantially greater than or equal to a short side of an A4 size sheet. The transporting mechanism defines a transportable gap smaller than or substantially equal to a short side of an A7 size sheet.

The above-mentioned duplex peripheral can perform the duplex scan and copy on the large-size and small-size documents, and it is unnecessary to use different types of scanners following by the connection to the printer. In addition, the documents, such as hard cards, that cannot be transported past the conventional sheet-fed peripheral, may also be scanned/copied.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 2:
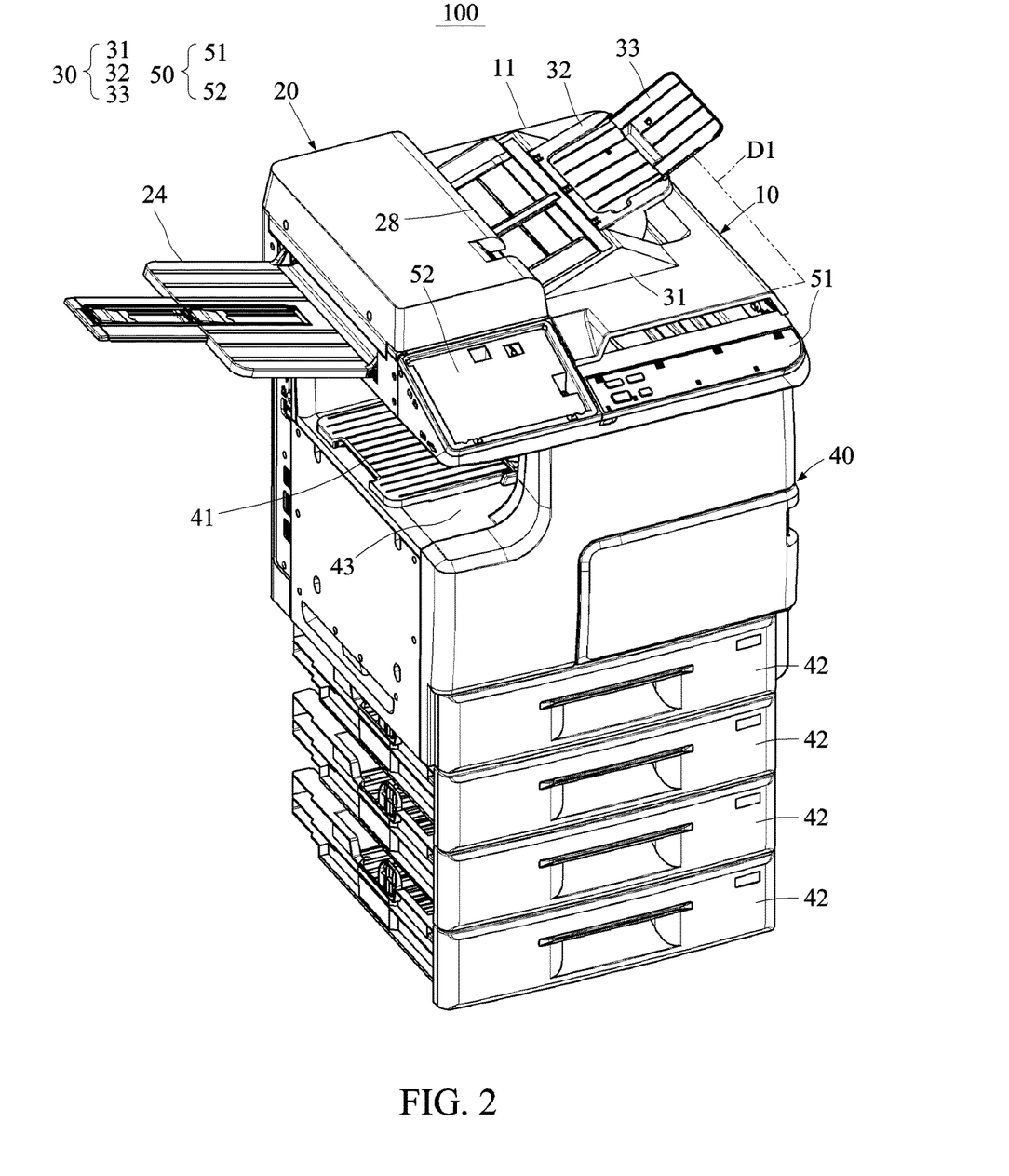
FIG. 2 shows a pictorial view of a peripheral according to a first embodiment of the present invention.
Figure 3:
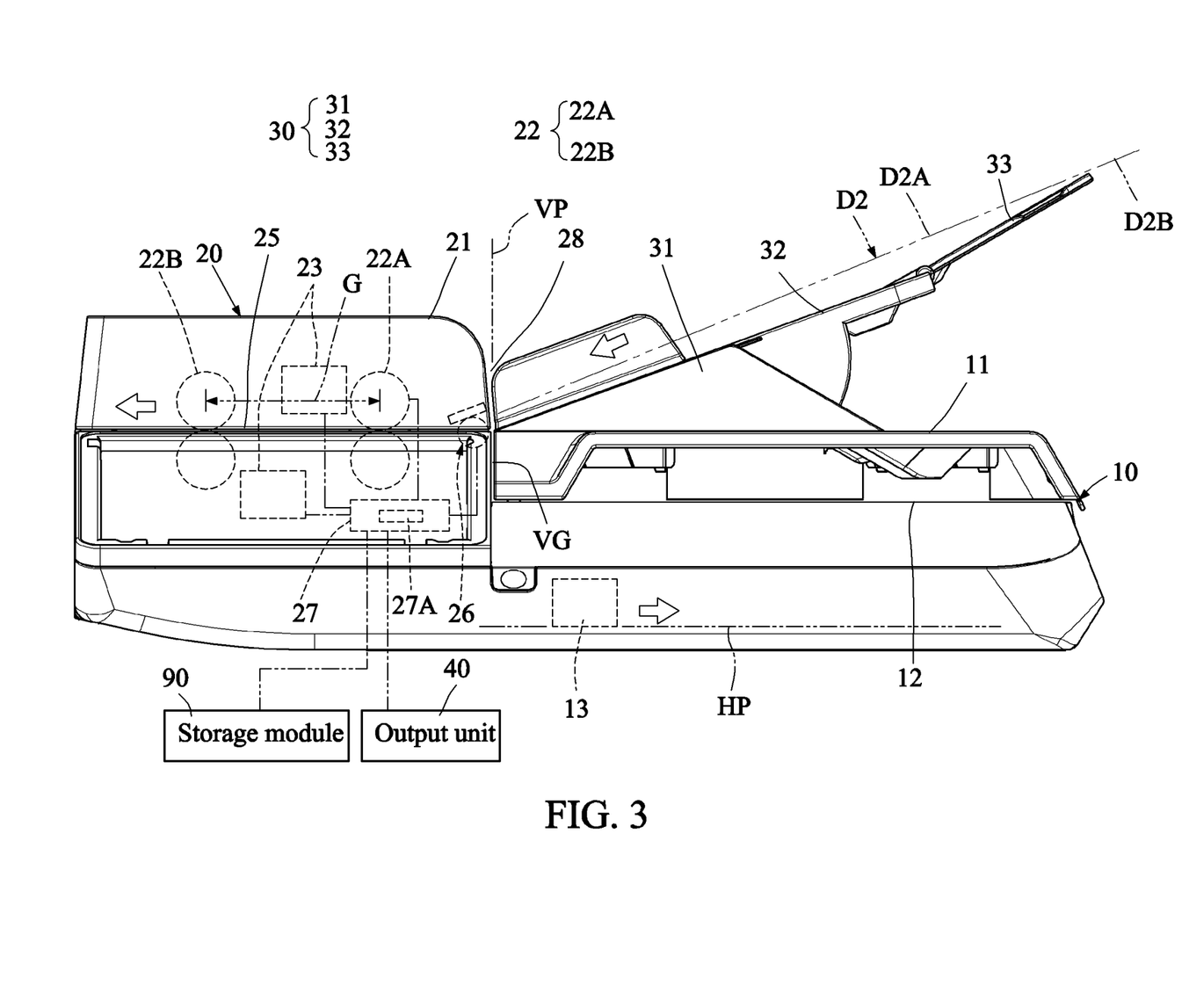
FIG. 3 shows a partial front view of the peripheral according to the first embodiment of the present invention.

FIG. 2 shows a pictorial view of a peripheral 100 according to a first embodiment of the present invention. It is worth noting that a left side plate of the peripheral 100 of FIG. 2 is removed. FIG. 3 shows a partial front view of the peripheral 100 according to the first embodiment of the present invention. As shown in FIGS. 2 and 3, the peripheral 100 of this embodiment may be one copier capable of functioning as a scanner as well as a printer, may be an independent machine, and may also be a machine connected to a network or an electronic apparatus. The peripheral 100 comprises a flatbed scanning device 10, a sheet-fed scanning device 20, a multi-stage input tray 30, an output unit 40, a user interface 50 and a storage module 90. The storage module 90 may be, for example, a memory card, a mobile disk or the associated connection interface thereof.

The flatbed scanning device 10 comprises a rotatable upper cover 11 for covering a first document (or referred to as a first medium) D1 on which a flatbed scan is performed. That is, a movable scanning module is utilized to scan the stationary document. The user can lift up the upper cover 11, then place the first document D1, and then close the upper cover 11. The first document D1 may be an ordinary document, a book, an identity card, a card or the like.

The sheet-fed scanning device 20 abuts upon the upper cover 11 and performs a sheet-fed scan on a second document (or referred to as a second medium) D2. That is, a stationary scanning module is utilized to scan a moving document. In detail, a transporting mechanism 22 (comprising transporting rollers 22A and 22B in this non-restrictive example) in the sheet-fed scanning device 20 is utilized to transport and move the document. For the upright peripheral 100 shown in FIG. 2, the sheet-fed scanning device 20 abuts upon the upper cover 11 in the horizontal direction. The sheet-fed scanning device 20 is no longer mounted on the upper cover 11. Thus, the user needs not exert other force to lift up the sheet-fed scanning device 20 upon lifting the upper cover 11.

The multi-stage input tray 30 comprises a first tray 31, a second tray 32 and a third tray 33. The first tray 31 disposed on the upper cover 11 supports the second document D2. The second tray 32 is pivotally connected to the first tray 31. The third tray 33 is connected to the second tray 32 and assists in supporting the second document D2 in a used state. The third tray 33 may also be retracted onto the second tray 32, and more particularly be retracted into a concave portion of the second tray 32.

In the mode shown in FIG. 3, the upper cover 11 is shut relative to a scan platen 12 of the flatbed scanning device 10, and the multi-stage input tray 30 guides the second document D2 into an entrance 28 of the sheet-fed scanning device 20. That is, after the upper cover 11 is closed, the upper cover 11 becomes one portion of the multi-stage input tray 30.

In one embodiment, the output unit 40 comprises a printing device. The flatbed scanning device 10 and the sheet-fed scanning device 20 are disposed on and electrically connected to the output unit 40. The output unit 40 performs a printing operation according to an output of the flatbed scanning device 10 or the sheet-fed scanning device 20. The output unit 40 has supply trays 42 for supplying various formats of media, such as sheets, cards, slides and the like. An output tray 41 of the output unit 40 for supporting printed media S is disposed in a receptacle 43 under the sheet-fed scanning device 20. Thus, the user can uniformly use the right hand to take or place to-be-scanned documents, and the left hand to take the scanned or printed documents or media, thereby an ordered operation method is provided. In addition, the receptacle 43 may also function as a heat dissipating space for the flatbed scanning device 10, the sheet-fed scanning device 20 and the output unit 40. Thus, the portions of the flatbed scanning device 10, the sheet-fed scanning device 20 and the output unit 40 facing the receptacle 43 may be formed with ventilation slots or installed with heat dissipating fans, which can also dissipate the heat of the printed media S.

The sheet-fed scanning device 20 comprises a case portion 21, the transporting mechanism 22, a fixed scanning module 23 (the upper scanning module 23 in FIG. 3) and a discharge tray 24. The case portion 21 abuts upon the upper cover 11. The transporting mechanism 22 is disposed in the case portion 21. The fixed scanning module 23 is disposed in the case portion 21 and scans the second document D2 transported past the fixed scanning module 23 by the transporting mechanism 22. The discharge tray 24 for supporting the scanned second document D2 is connected to the case portion 21.

Referring again to FIG. 3, the flatbed scanning device 10 comprises a movable scanning module 13 for scanning the simplex image of the first document D1, and the sheet-fed scanning device 20 comprises two fixed scanning modules 23 for scanning the front side image and the reverse side image of the second document D2. The moving direction of the movable scanning module 13 is substantially parallel to the moving direction of the second document D2. Because the sheet-fed scanning device 20 of this embodiment has the straightforward type transporting path, the sheet-fed scanning device 20 can scan the hard document, such as the certificate or card, can perform the duplex scan, and can print the duplex scan result on the same side of the medium. The user can achieve this effect without performing the conventional complicated operations. In addition, because the peripheral 100 has three scanning modules, it is possible to utilize the flatbed scanning device 10 and the sheet-fed scanning device 20 to perform the scanning concurrently, and the scan results are printed on two sides of the medium. For example, the flatbed scanning device 10 scans an application form, the sheet-fed scanning device 20 scans the front and reverse sides of the identity card, and the output unit 40 can perform the duplex printing to copy the contents of the application form onto the first side of the medium, and copy the contents of the front and reverse sides of the identity card onto the second side of the medium. The user can rapidly obtain a copied form having the reverse side printed with the contents of the front and reverse sides of the identity card, so the application is very convenient.

The user interface 50 is disposed on the flatbed scanning device 10, abuts upon the upper cover 11, and is electrically connected to the flatbed scanning device 10, the sheet-fed scanning device 20 and the output unit 40, so that a user can perform the control and monitor operations through the user interface 50. The above-mentioned copy operations may be performed through the user interface 50. In this embodiment, the user interface 50 comprises a set of keys 51 and a display device 52. The set of keys 51 is disposed on the flatbed scanning device 10 and abuts upon the upper cover 11. The display device 52 is rotatably disposed and abuts upon the set of keys 51 and the sheet-fed scanning device 20. The user can perform the preview operation through the display device 52, and can perform the adjusting or verifying operation through the set of keys. The display device 52 can display the information, and may further function as a touch screen, through which the user can input instructions, whereas the keys 51 serve as quick function keys.

It is worth noting that, in the definition of another example, the first tray 31 may be regarded as one portion of the upper cover 11. Thus, the sheet-fed scanning device 20 can perform a sheet-fed scan on the second document D2 placed on the upper cover 11, so that the copy operation can be performed.

According to the design of the present invention, the peripheral 100 is capable of processing both the large-size document and the small-size document, and solves the prior art problem that only the large-size document or the small-size document can be processed. The further design concept of the present invention will be described in detail.

Referring to FIGS. 2 and 3, the peripheral 100 of this embodiment comprises a horizontal passage 25, a feeding mechanism 26, two scanning modules 23, the transporting mechanism 22, a control module 27 and the output unit 40.

In this embodiment, the passage 25 is a straightforward type passage. The feeding mechanism 26 is disposed on the front end of the passage 25, and transports a medium D2 into the passage 25 to provide a sheet-fed scan mode to the user. In one example, the feeding mechanism 26 comprises a separation roller and a friction pad. In another example, the feeding mechanism 26 comprises a pick-up roller. The two scanning modules 23 are disposed on two sides of the passage 25 and acquire a front side image D2A and a reverse side image D2B of the medium D2, respectively.

In this embodiment, the transporting mechanism 22 comprises two transporting rollers 22A and 22B separately disposed on the horizontal passage 25. The transporting mechanism 22 transports the medium D2 through the passage 25 and past the scanning modules 23 in a horizontal direction. The control module 27 is electrically connected to the scanning modules 23, the feeding mechanism 26 and the transporting mechanism 22, and digitizes the front side image D2A and the reverse side image D2B, coming from the scanning modules 23, to facilitate the subsequent image processing or data transmission. This is different from the conventional copier, which only executes the copy function, and does not execute the image processing function. The control module 27 controls the feeding mechanism 26 to execute the function, such as the medium feeding function, controls the transporting rollers 22A and 22B to transport the medium D2, and controls the scanning modules 23 to acquire the front side image D2A and the reverse side image D2B of the medium D2. The control module 27 comprises an image processing unit 27A, which performs a skew correction on the front side image D2A and the reverse side image D2B to de-skew the front side image D2A and the reverse side image D2B according to the side frame or the text arrangement direction. In another embodiment, the image processing unit 27A can perform image recognition on the front side image D2A and the reverse side image D2B to judge whether the front side image D2A and the reverse side image D2B are blank images. If one of the images is judged as the blank image, it is deleted and will not be outputted. In addition, the mounting position of the control module 27 is not restricted to the inside of the case portion 21, and the control module 27 may be mounted at an arbitrary position inside the peripheral 100 and be shared with the peripheral 100.

The output unit 40 is electrically connected to the control module 27 and receives and outputs the front side image D2A and the reverse side image D2B. In this embodiment, the output unit 40 comprises a printing device. In another embodiment, the output unit 40 comprises an output interface (or output port) to be connected to an external storage device, or a network port, and can execute the function, such as facsimile, electronic mail sending, file transfer, or the like.

In addition, the peripheral 100 may further comprise the flatbed scanning device 10 for providing a flatbed scan mode to the user. The flatbed scanning device 10 comprises a third scanning module 13, which is movable in the horizontal direction and on a horizontal plane HP parallel to and lower than the horizontal passage 25 and dedicated for the flatbed scan mode, wherein the scan platen 12 is parallel to and lower than the horizontal passage 25, and the horizontal passage 25 extends to a position, which is located between the feeding mechanism 26 and the roller 22A and outside a range between the two transporting rollers 22A and 22B. In this embodiment, the feeding mechanism 26 transports the large-size medium D2 and the small-size medium D2, which are inclined, from the inclined input tray 30. In this embodiment, a vertical gap VG directly adjacent to the front end of the horizontal passage 25 and disposed on a vertical plane VP is formed between the case portion 21 and the rotatable upper cover 11. The horizontal passage 25, on which the front side image and the reverse side image of each of the small-size medium and the large-size medium are acquired by the two scanning modules 23, and the horizontal scan platen 12, which is lower than the horizontal passage 25, are disposed on left and right sides of the vertical plane VP, respectively.

In order to transport the small-size document, the transporting mechanism 22 defines a transportable gap G, in which the two scanning modules 23 are disposed. The transportable gap G between the two transporting rollers 22A and 22B is smaller than or substantially equal to a short side (74 mm) of an A7 size sheet (74 mm×105 mm). In another example, the transportable gap G is smaller than or substantially equal to a short side (52 mm) of an A8 size sheet (74 mm×52 mm). In still another example, the transportable gap G is smaller than or equal to 60 mm and transports the small-size document larger than or equal to the A8 size sheet. Alternatively, the transporting rollers 22A and 22B are sufficient to transport the small-size document approximating the A8 size sheet. In a non-limitative example, the transportable gap G ranges between 58 and 52 mm, and may be 55 mm, for example. Thus, the sheet-fed scanning device 20 is suitable for the scanning of the identity card, and is also suitable for the scanning of the document larger than the A4 size sheet (210 mm×297 mm). In order to process the large-size document, a width W of the medium that can be accommodated within the passage 25 and the feeding mechanism 26 is substantially greater than or equal to the short side of an A4 size sheet, and this is different from the scanner dedicated for the scanning of the card or business card. The details thereof will be described with reference to FIG. 7.

Figure 4:
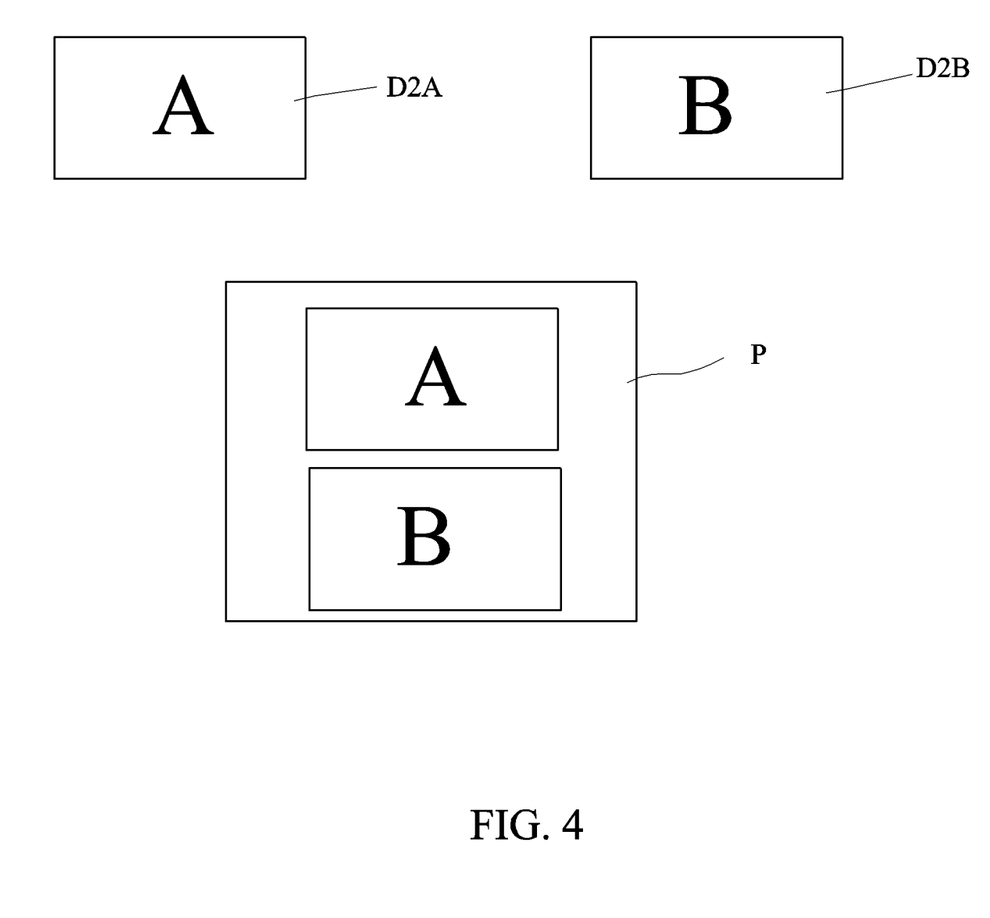
FIGS. 4 and 5 show schematic views of operations according to the first embodiment of the present invention.
Figure 5:
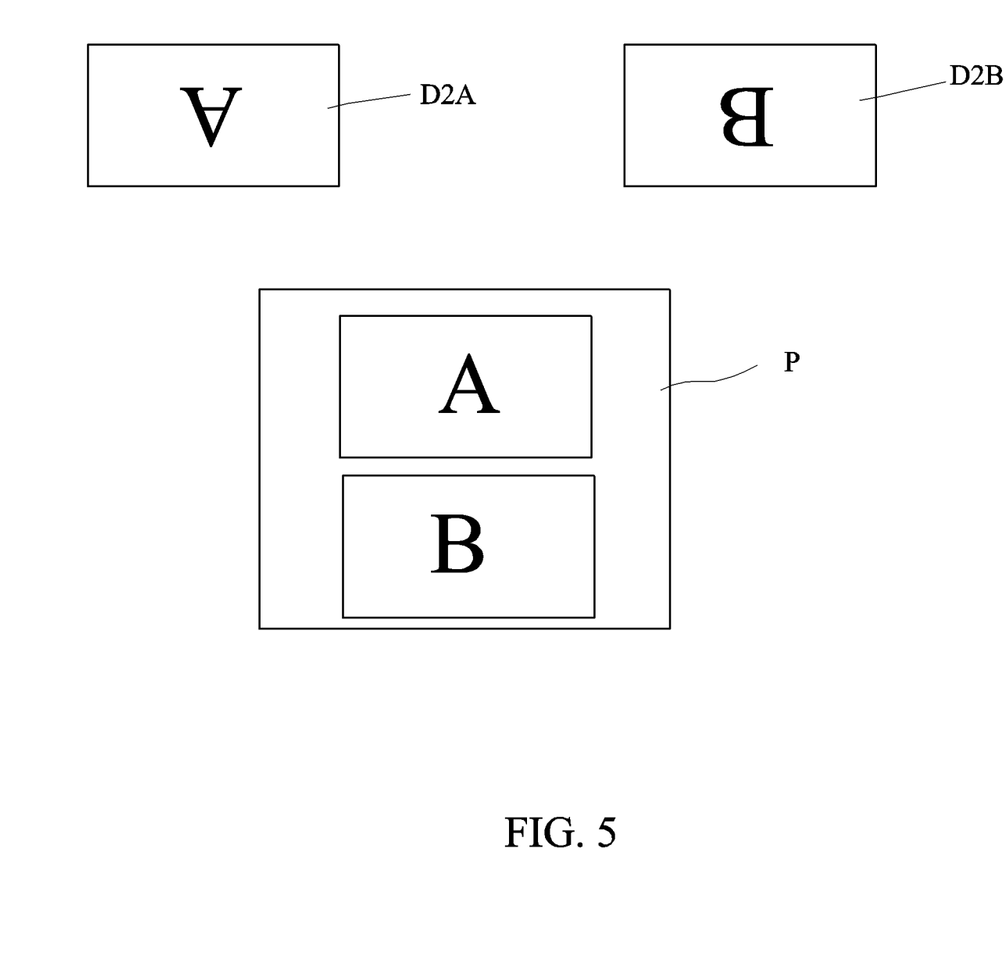

FIGS. 4 and 5 show schematic views of operations according to the first embodiment of the present invention. As shown in FIGS. 4 and 3, the control module 27 controls the output unit 40 to output the front side image D2A and the reverse side image D2B to one single page P (i.e., the same side of the same sheet). Consequently, the user only has to execute one scan, and the operation of copying the front side and reverse side images of the identity card onto one single page, for example. As shown in FIGS. 5 and 3, the image processing unit 27A performs the image recognition on the front side image D2A and the reverse side image D2B to generate image recognition results, and judges whether the medium is inverted according to the image recognition results, wherein the image recognition may comprise text recognition, and may also be performed based on the standard pattern that may be present in the image. Thus, the user will not get confused in the placement orientations of the documents. Even if the front side and reverse side images are inverted, the images of the finally output page(s) P are still rotated into the upright state without the problem that the right and left, and the up and down are reversed. In addition, using this technology can obtain the upright front side image D2A and reverse side image D2B arranged on the same page or even printed on one single page when either the medium D2 is configured to flip in the left-right direction or the top-bottom direction.

Figure 6:
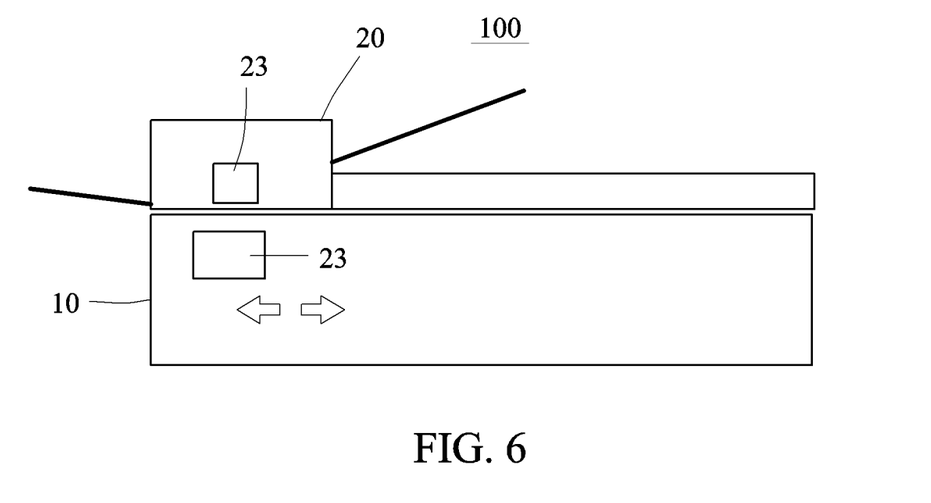
FIG. 6 shows a schematic front view of a peripheral according to a second embodiment of the present invention.

FIG. 6 shows a schematic front view of a peripheral 100 according to a second embodiment of the present invention. Referring to FIG. 6, one of the two scanning modules 23 is movable in the horizontal direction in the flatbed scan mode, is disposed in the flatbed scanning device 10 and is shared between the flatbed scan mode and the sheet-fed scan mode.

Figure 7:
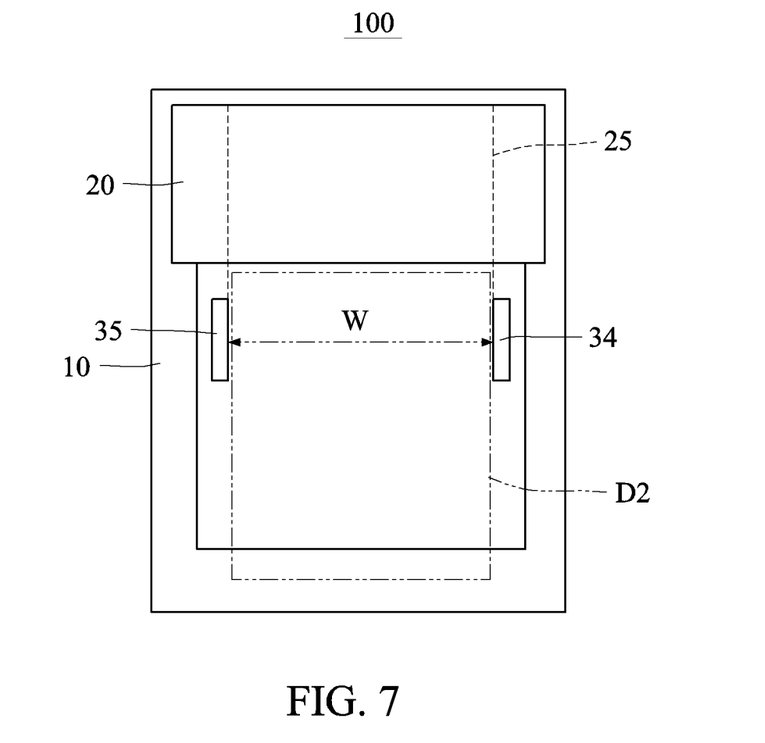
FIG. 7 shows a schematic top view of the peripheral according to the second embodiment of the present invention.

FIG. 7 shows a schematic top view of the peripheral according to the second embodiment of the present invention. As shown in FIG. 7, this embodiment is similar to the first embodiment, and a width W that can accommodate the medium D2 is depicted, wherein the width W is determined by the guide plates 34 and 35 on one hand, and is determined according to the structure of the sheet passage 25 on the other hand. The width W is substantially greater than or equal to a short side of an A4 size sheet (i.e., 210 millimeters). Thus, this is different from the duplex scanner dedicated for the scanning of the card or business card.

With the embodiments of the present invention, the duplex sheet-fed peripheral is advantageous to the executing of the duplex scan on the large-size and small-size two-sided documents, the skew correction and the one single page print adjustment function to achieve the output required by the user. Thus, the present invention is properly designed so that the duplex sheet-fed peripheral can perform both the duplex scan and copy on the large-size and small-size documents, and this is not found in the conventional card dedicated scanner and the conventional copier.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A peripheral, comprising:
    an input tray supporting a large-size medium and a small-size medium, which is a hard medium smaller than the large-size medium;
    a horizontal passage;
    a feeding mechanism, which is disposed on a front end of the horizontal passage and transports the large-size medium and the small-size medium from the input tray into the horizontal passage to provide a sheet-fed scan mode to a user;
    two scanning modules, which are disposed on two sides of the horizontal passage and acquire a front side image and a reverse side image of each of the small-size medium and the large-size medium, respectively, when each of the small-size medium and the large-size medium is transported horizontally;
    a transporting mechanism comprising two transporting rollers, which are separately disposed on the horizontal passage and transport each of the small-size medium and the large-size medium through the horizontal passage past the scanning modules in a horizontal direction;
    a control module, which is electrically connected to the scanning modules, the feeding mechanism and the transporting mechanism, and digitizes the front side image and the reverse side image coming from the scanning modules;
    an output unit, which is electrically connected to the control module, and receives and outputs the front side image and the reverse side image;
    a flatbed scanning device providing a flatbed scan mode to the user, wherein the flatbed scanning device comprises a rotatable upper cover and a horizontal scan platen, the rotatable upper cover presses a document on the horizontal scan platen, and the input tray is disposed on the rotatable upper cover; and
    a case portion abutting upon the rotatable upper cover, wherein the transporting mechanism and the scanning modules are disposed in the case portion, and a vertical gap directly adjacent to the front end of the horizontal passage and disposed on a vertical plane is formed between the case portion and the input tray which forms one portion with the rotatable upper cover, wherein the horizontal passage, on which the front side image and the reverse side image of each of the small-size medium and the large-size medium are acquired by the two scanning modules, and the horizontal scan platen, which is lower than the horizontal passage, are disposed on left and right sides of the vertical plane, respectively;
    wherein the transporting mechanism defines a horizontal transportable gap between the two transporting rollers, and the two scanning modules are disposed in the horizontal transportable gap smaller than or substantially equal to 74 millimeters in the sheet-fed scan mode when a width of the large-size medium that can be accommodated within the horizontal passage and the feeding mechanism is substantially greater than or equal to 210 millimeters and when the feeding mechanism transports the large-size medium and the small-size medium, which are inclined, from the inclined input tray.

2. The peripheral according to claim 1, wherein the horizontal passage is a straightforward type passage.

3. The peripheral according to claim 1, wherein the flatbed scanning device comprises a third scanning module, which is movable in the horizontal direction and on a horizontal plane parallel to and lower than the horizontal passage and dedicated for the flatbed scan mode.

4. The peripheral according to claim 1, wherein the horizontal transportable gap is smaller than or substantially equal to a short side of an A8 size sheet.

5. The peripheral according to claim 1, wherein the control module comprises an image processing unit performing skew corrections on the front side image and the reverse side image.

6. The peripheral according to claim 1, wherein the control module comprises an image processing unit performing image recognition on the front side image and the reverse side image to generate image recognition results, and judging whether the large-size or small-size medium is inverted according to the image recognition results.

7. The peripheral according to claim 6, wherein the image recognition comprises text recognition.

8. The peripheral according to claim 1, wherein the control module comprises an image processing unit performing image recognition on the front side image and the reverse side image, and judging whether the front side image and the reverse side image are blank images.

9. The peripheral according to claim 1, wherein the output unit comprises a printing device.

10. The peripheral according to claim 1, wherein the output unit comprises an output port to be connected to an external storage device.

11. The peripheral according to claim 1, wherein the output unit comprises a network port.

12. The peripheral according to claim 1, wherein the control module controls the output unit to output the front side image and the reverse side image on one single page.

13. The peripheral according to claim 1, further comprising a discharge tray supporting the large-size medium and the small-size medium after being scanned, wherein:
the two scanning modules are disposed in the horizontal transportable gap smaller than or substantially equal to 74 millimeters in the sheet-fed scan mode when the width of the large-size medium that can be accommodated within the horizontal passage and the feeding mechanism is substantially greater than or equal to 210 millimeters and when both the large-size medium and the small-size medium coming from the input tray are transported by the two transporting rollers to the discharge tray through the horizontal passage.

14. The peripheral according to claim 1, wherein the horizontal passage extends to a position, which is located between the feeding mechanism and one of the rollers and outside a range between the two rollers.

\* \* \* \* \*